United States Patent
Miki et al.

(10) Patent No.: US 9,385,363 B2
(45) Date of Patent: Jul. 5, 2016

(54) PRODUCING METHOD OF COMPOSITE ACTIVE MATERIAL, COATING APPARATUS, COMPOSITE ACTIVE MATERIAL AND ALL SOLID STATE BATTERY

(71) Applicants: Nariaki Miki, Toyota (JP); Takayuki Uchiyama, Toyota (JP)

(72) Inventors: Nariaki Miki, Toyota (JP); Takayuki Uchiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 422 days.

(21) Appl. No.: 13/727,699

(22) Filed: Dec. 27, 2012

(65) Prior Publication Data
US 2013/0171526 A1 Jul. 4, 2013

(30) Foreign Application Priority Data

Dec. 28, 2011 (JP) .................. 2011-288416
Mar. 7, 2012 (JP) .................. 2012-050565
Apr. 27, 2012 (JP) .................. 2012-102889
Oct. 22, 2012 (JP) .................. 2012/233180

(51) Int. Cl.
*H01M 4/04* (2006.01)
*H01M 4/36* (2006.01)
*H01M 4/139* (2010.01)

(52) U.S. Cl.
CPC .......... *H01M 4/0402* (2013.01); *H01M 4/0471* (2013.01); *H01M 4/139* (2013.01); *H01M 4/366* (2013.01); *Y02E 60/122* (2013.01)

(58) Field of Classification Search
None
See application file for complete search history.

(56) References Cited

U.S. PATENT DOCUMENTS 7,608,153 B2 * 10/2009 Tayu ............... H01F 1/0576
148/101

2003/0005578 A1 * 1/2003 Jito ............... C23C 14/564
29/623.5
2009/0081554 A1   3/2009 Takada et al.
2011/0028299 A1 * 2/2011 Saitou ............ C03B 19/1453
501/53
2011/0118361 A1 * 5/2011 Matoishi ............ A61K 8/86
514/772.1
2012/0164335 A1 * 6/2012 Maliverney ........ C08J 7/047
427/342
2014/0079873 A1 * 3/2014 Miki ............... H01M 4/505
427/58

FOREIGN PATENT DOCUMENTS

| JP | H01093425 | 4/1989 |
| JP | 2004-199879 A | 7/2004 |
| JP | 2005-183781 A | 7/2005 |
| JP | 2010244847 A * | 10/2010 |
| WO | 2007-004590 A1 | 1/2007 |

OTHER PUBLICATIONS

JP 2010244847 A machine English translation.*

* cited by examiner

*Primary Examiner* — Scott J Chmielecki
(74) *Attorney, Agent, or Firm* — Dinsmore & Shohl LLP

(57) ABSTRACT

A method of producing a composite active material having an active material and a coat layer containing an ion conductive oxide and formed on a surface of the active material, including: applied film forming step of forming an applied film by applying a coating liquid for coat layer, containing an alkoxide compound as a raw material of the ion conductive oxide, on a surface of the active material under an atmosphere of lower dew-point temperature than dew-point temperature where the active material deteriorates; hydrolysis promoting step of promoting hydrolysis of the alkoxide compound by exposing the applied film under an atmosphere of higher dew-point temperature than dew-point temperature in the applied film forming step; and heat-treating step of forming the coat layer by heat-treating the applied film after the hydrolysis promoting step.

7 Claims, 7 Drawing Sheets

PRODUCING METHOD OF COMPOSITE ACTIVE MATERIAL, COATING APPARATUS, COMPOSITE ACTIVE MATERIAL AND ALL SOLID STATE BATTERY

TECHNICAL FIELD

The present invention relates to a producing method of a composite active material having an active material and a coat layer containing an ion conductive oxide and formed on a surface thereof.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Here, organic liquid electrolyte using a flammable organic solvent is used for a conventionally commercialized lithium battery, so that the installation of a safety device for restraining temperature rise during a short circuit and the improvement in structure and material for preventing the short circuit are necessary therefor. On the contrary, an all solid state battery such that the liquid electrolyte is replaced with a solid electrolyte is conceived to intend the simplification of the safety device and be excellent in production cost and productivity for the reason that the flammable organic solvent is not used in the battery.

In the field of such an all solid state battery, an attempt to intend the performance improvement of the battery is offered while noticing an interface between an active material and an electrolyte material. For example, in Patent Literature 1, it is disclosed that the surface of the cathode active material for the all solid state battery is covered with a lithium ion conductive oxide to restrain a high resistive layer from being formed on an interface between a cathode active material and a sulfide solid electrolyte material. Furthermore, in Patent Literature 2, an organic/inorganic hybrid type ion conductor having a specific general formula is disclosed, and it is disclosed that the ion conductor is synthesized by a sol-gel method in a nitrogen atmosphere.

CITATION LIST

Patent Literature

Patent Literature 1: WO 2007/004590 A
Patent Literature 2: JP 2004-199879 A

SUMMARY OF INVENTION

Technical Problem

Incidentally, a method utilizing a sol-gel method is used as a general method for forming a coat layer on the surface of an active material. The sol-gel method is such that sol such as an alkoxide hydrolysate is gelated on the surface of the active material and the gel is heated to form the coat layer made of an oxide having ion conductivity. For example, in Patent Literature 1, the covering (the formation of the coat layer) of the cathode active material surface with a lithium ion conductive oxide is performed in such a manner that cathode active material powder is regarded as a fluidized bed in a rolling fluid system to spray an alkoxide solution containing lithium and titanium, and the alkoxide compound is further hydrolyzed by humidity in the air and thereafter heated.

However, in the case where a composite active material produced by a producing method using a sol-gel method is used for an all solid state battery, the problem is that occasionally sufficient output characteristics are not obtained.

In view of the above-mentioned actual circumstances, through earnest studies, the inventors of the present invention have learned that the above-mentioned problem is made for the reason that the above-mentioned composite active material has the deteriorated active material and the coat layer with impurities caused. In addition, the inventors of the present invention have completed the present invention by finding out that the deterioration of the above-mentioned active material and the occurrence of impurities in the coat layer are greatly influenced by dew-point temperature during producing processes.

That is to say, a main object of the present invention is to provide a producing method of a composite active material capable of restraining the active material from deteriorating and of decreasing impurities in the coat layer.

Solution to Problem

In order to solve the above-mentioned problem, the present invention provides a producing method of a composite active material having an active material and a coat layer containing an ion conductive oxide and formed on a surface of the above-mentioned active material, including: applied film forming step of forming an applied film by applying a coating liquid for coat layer, containing an alkoxide compound as a raw material of the ion conductive oxide, on a surface of the above-mentioned active material under an atmosphere of lower dew-point temperature than dew-point temperature where the above-mentioned active material deteriorates; hydrolysis promoting step of promoting hydrolysis of the above-mentioned alkoxide compound by exposing the above-mentioned applied film under an atmosphere of higher dew-point temperature than dew-point temperature in the above-mentioned applied film forming step; and heat-treating step of forming the above-mentioned coat layer by heat-treating the applied film after the above-mentioned hydrolysis promoting step.

According to the present invention, applied film forming step allows the coating liquid for coat layer to be applied on a surface of the active material under an atmosphere of lower dew-point temperature than dew-point temperature where the active material deteriorates, so that the active material may be restrained from deteriorating due to moisture (humidity) in the atmosphere. Furthermore, hydrolysis promoting step allows the hydrolysis of the alkoxide compound in the applied film to be promoted by utilizing moisture in the atmosphere while restraining the active material from reacting with moisture in the atmosphere by the applied film, so that the amount of impurity carbon, which is caused for the reason that a component composing the applied film carbonizes in heat-treating step for example, may be decreased. Therefore, according to the present invention, applied film forming step and hydrolysis promoting step allow the composite active material to be produced, which offers less deterioration of the active material and smaller impurity carbon amount in the coat layer.

In the present invention, the dew-point temperature in the above-mentioned applied film forming step is preferably −30° C. or less. The reason therefor is to allow the deterioration of the active material to be appropriately restrained.

In the present invention, the dew-point temperature in the above-mentioned hydrolysis promoting step is preferably 0° C. or more. The reason therefor is to allow the hydrolysis of the above-mentioned alkoxide compound to be favorably promoted.

In the above-mentioned invention, the above-mentioned hydrolysis promoting step is preferably performed under a humidified atmosphere. The reason therefor is to allow the hydrolysis of the alkoxide compound to be sufficiently promoted.

In the above-mentioned invention, the above-mentioned hydrolysis promoting step is preferably performed under an inert gas atmosphere. The reason therefor is to allow the applied film to be restrained from deteriorating due to oxygen and carbon dioxide, for example.

In the above-mentioned invention, exposure time in the above-mentioned hydrolysis promoting step is preferably 4 hours or more.

In the above-mentioned invention, exposure time in the above-mentioned hydrolysis promoting step is preferably 24 hours or less.

Furthermore, the present invention provides a coating apparatus including a process chamber, and a fluidizing gas feed unit and a fluidizing gas exhausting unit connected to the above-mentioned process chamber, wherein a coating liquid feed unit to feed a coating liquid for coat layer, containing an alkoxide compound as a raw material of an ion conductive oxide, and a hydrolysis promoting fluid feed unit, located on a downstream side from the coating liquid feed unit in a flow direction of the fluidizing gas, to feed a hydrolysis promoting fluid for promoting hydrolysis of the above-mentioned alkoxide compound are connected to the above-mentioned process chamber.

According to the present invention, the disposition of the hydrolysis promoting fluid feed unit on the downstream side from the coating liquid feed unit in a flow direction of the fluidizing gas allows a composite active material to be efficiently formed, which offers less deterioration of the active material and smaller impurity carbon amount in the coat layer.

Furthermore, the present invention provides a composite active material having an active material and a coat layer containing an ion conductive oxide and formed on a surface of the above-mentioned active material, wherein an impurity carbon amount is less than 1.56% by weight with respect to the above-mentioned coat layer.

According to the present invention, the impurity carbon amount is so small as to allow the composite active material with low reaction resistance.

Furthermore, the present invention provides a composite active material having an active material and a coat layer containing an ion conductive oxide and formed on a surface of the above-mentioned active material, wherein a lithium carbonate amount is less than 0.075% by weight with respect to the above-mentioned active material.

According to the present invention, the lithium carbonate amount is so small as to allow the composite active material with low reaction resistance.

In the above-mentioned invention, the impurity carbon amount is preferably less than 1.56% by weight with respect to the above-mentioned coat layer.

In the above-mentioned invention, the above-mentioned ion conductive oxide is preferably $LiNbO_3$.

Furthermore, the present invention provides an all solid state battery having a cathode active material layer, an anode active material layer, and a solid electrolyte layer formed between the above-mentioned cathode active material layer and the above-mentioned anode active material layer, wherein at least one of the above-mentioned cathode active material layer and the above-mentioned anode active material layer contains the above-mentioned composite active material.

According to the present invention, the use of the above-mentioned composite active material allows the battery with low reaction resistance.

Advantageous Effects of Invention

A producing method of a composite active material of the present invention produces the effect such as to allow the composite active material, which offers less deterioration of the active material and smaller impurity carbon amount in the coat layer.

DESCRIPTION OF EMBODIMENTS

A producing method of a composite active material, a coating apparatus, a composite active material and an all solid state battery of the present invention are hereinafter described.

A. Producing Method of Composite Active Material

A producing method of a composite active material of the present invention is a producing method of a composite active material having an active material and a coat layer containing an ion conductive oxide and formed on a surface of the above-mentioned active material, including applied film forming step of forming an applied film by applying a coating liquid for coat layer, containing an alkoxide compound as a raw material of the ion conductive oxide, on a surface of the above-mentioned active material under an atmosphere of lower dew-point temperature than dew-point temperature where the above-mentioned active material deteriorates; hydrolysis promoting step of promoting hydrolysis of the above-mentioned alkoxide compound by exposing the above-mentioned applied film under an atmosphere of higher dew-point temperature than dew-point temperature in the above-mentioned applied film forming step; and heat-treating step of forming the above-mentioned coat layer by heat-treating the applied film after the above-mentioned hydrolysis promoting step.

Figure 1:
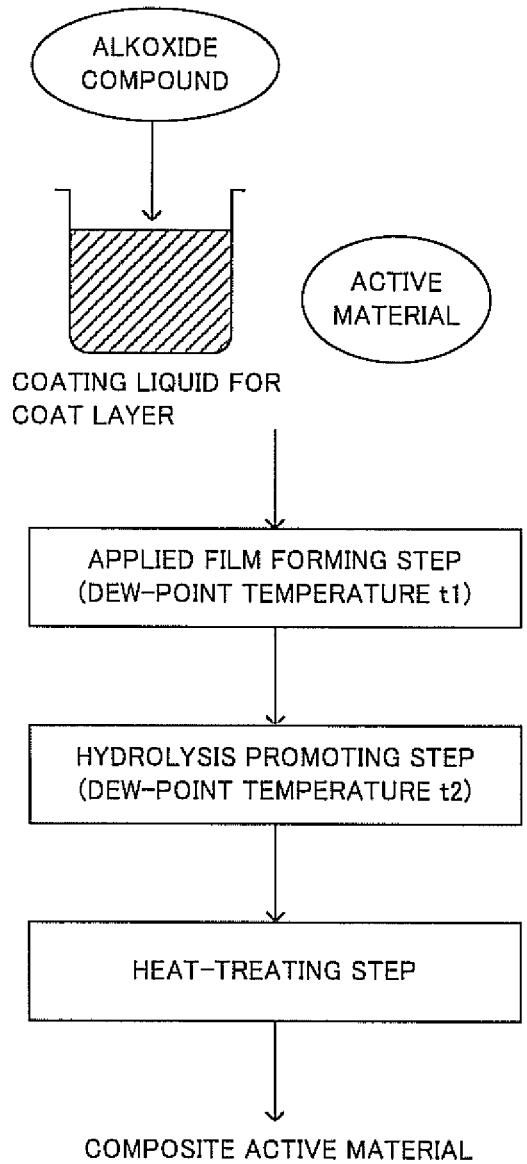
FIG. 1 is a flow chart showing an example of a producing method of a composite active material of the present invention.

FIG. 1 is a flow chart showing an example of the producing method of a composite active material of the present invention. As exemplified in FIG. 1, in the present invention, the active material and the coating liquid for coat layer which contains an alkoxide compound as a raw material of the ion conductive oxide are prepared to form an applied film by applying the coating liquid for coat layer on a surface of the active material under an atmosphere of a dew-point temperature t1 (applied film forming step). The dew-point temperature t1 is lower dew-point temperature than dew-point temperature where the active material deteriorates. Next, the hydrolysis of the above-mentioned alkoxide compound is promoted by exposing the above-mentioned applied film under an atmosphere of a dew-point temperature t2 (hydrolysis promoting step). The dew-point temperature t2 is higher dew-point temperature than the dew-point temperature t1 in applied film forming step. Next, the coat layer is formed by heat-treating the applied film after hydrolysis promoting step (heat-treating step).

Figure 2:
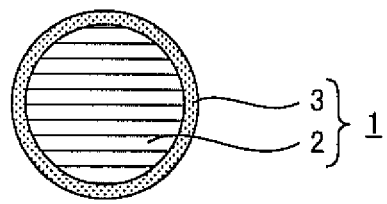
FIG. 2 is a schematic cross-sectional view showing an example of a composite active material produced by a producing method of a composite active material of the present invention.

The present invention, as exemplified in FIG. 2, may produce a composite active material 1 having an active material 2 and a coat layer 3 containing an ion conductive oxide and formed on a surface of the active material 2 through each of the above-mentioned steps. Here, FIG. 2 is a schematic cross-sectional view showing an example of the composite active material produced by a producing method of the present invention.

According to the present invention, applied film forming step allows the coating liquid for coat layer to be applied on a surface of the active material under an atmosphere of lower dew-point temperature than dew-point temperature where the active material deteriorates, so that the active material may be restrained from deteriorating due to moisture in the atmosphere. Furthermore, hydrolysis promoting step allows the alkoxide compound in the applied film to be favorably hydrolyzed by utilizing moisture in the atmosphere while restraining the active material from reacting with moisture in the atmosphere by the applied film, so that the amount of impurity carbon, which is caused for the reason that a component composing the applied film carbonizes in heat-treating step for example, may be decreased. Therefore, according to the present invention, applied film forming step and hydrolysis promoting step allow the composite active material to be produced, which offers less deterioration of the active material and smaller impurity carbon amount in the coat layer.

As described above, a method utilizing a sol-gel method is used as a general method for forming the coat layer on a surface of the active material. However, in an all solid state battery for which the composite active material produced by a producing method using a sol-gel method is used, the problem is that occasionally sufficient output characteristics are not obtained. In view of the above-mentioned actual circumstances, through earnest studies, the inventors of the present invention have learned that the above-mentioned problem results from the point that the above-mentioned composite active material has the deteriorated active material and the coat layer with impurities caused.

In addition, the inventors of the present invention have founded out that the deterioration of the above-mentioned active material and the occurrence of impurities in the coat layer are greatly influenced by dew-point temperature during producing processes.

Figure 3:
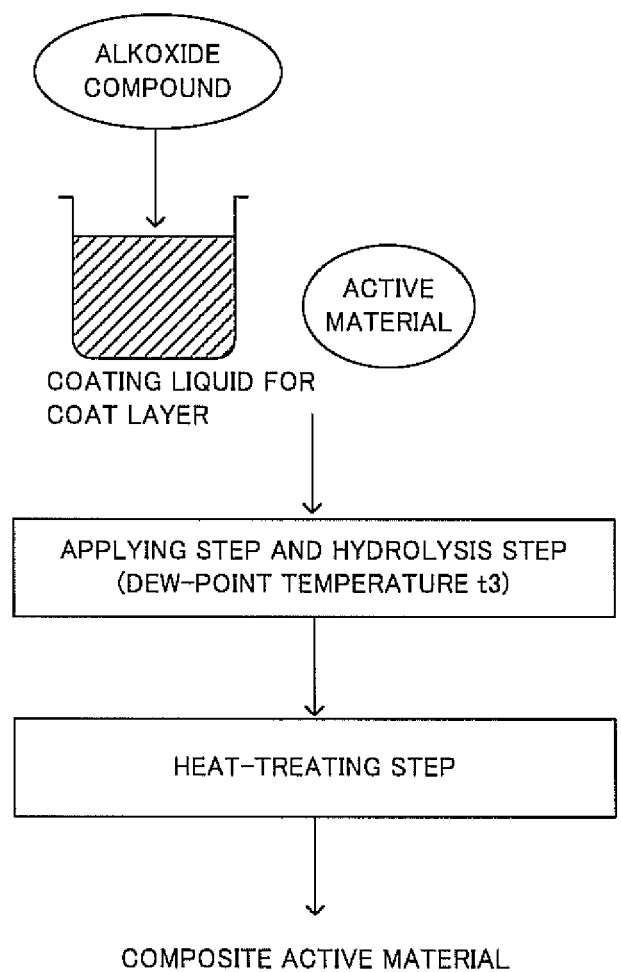
FIG. 3 is a flow chart showing an example of a conventional producing method of a composite active material.

That is to say, as exemplified in FIG. 3, in a conventional producing method of a composite active material, applying step of applying the coating liquid for coat layer on a surface of the active material and hydrolysis step of hydrolyzing a compound in the coating liquid for coat layer are ordinarily performed under an atmosphere of the same dew-point temperature t3. Thus, in the case where the above-mentioned applying step and hydrolysis step are performed in the air, that is, an atmosphere such that the dew-point temperature t3 is a dew-point temperature at which the hydrolysis of the alkoxide compound is promoted, it is conceived that the active material deteriorates due to moisture (humidity) in the air.

On the other hand, in order to restrain the active material from deteriorating, in the case where the above-mentioned applying step and hydrolysis step are performed under a dried atmosphere, that is, in an atmosphere such that the dew-point temperature t3 is a dew-point temperature at which moisture amount is restricted, it is conceived that the hydrolysis of the above-mentioned alkoxide compound does not sufficiently proceed and impurities are caused in the coat layer for the reason that part of a component composing the applied film carbonizes during heat-treating step, for example. FIG. 3 is a flow chart showing an example of the conventional producing method of a composite active material.

The present invention is greatly characterized in that applied film forming step and hydrolysis promoting step are performed in an atmosphere of appropriate dew-point temperature for each step while noticing that a dew-point temperature such as to allow the deterioration of the active material to be restrained and a dew-point temperature such as to allow the hydrolysis of the above-mentioned alkoxide compound to be promoted are different.

The producing method of a composite active material of the present invention is hereinafter described.

1. Applied Film Forming Step

Applied film forming step in the present invention is step of forming an applied film by applying a coating liquid for coat layer, containing an alkoxide compound as a raw material of the ion conductive oxide on a surface of the above-mentioned active material under an atmosphere of lower dew-point temperature than dew-point temperature where the above-mentioned active material deteriorates.

(1) Atmosphere of Applied Film Forming Step

An atmosphere in applying the coating liquid for coat layer in the present step is not particularly limited if the atmosphere is an atmosphere of lower dew-point temperature than dew-point temperature where the above-mentioned active material deteriorates, but is properly selected in accordance with kinds of the active material. Here, "dew-point temperature where the active material deteriorates" may be obtained by the following measurement, for example.

That is to say, in the case where the active material deteriorates due to moisture in the atmosphere, part of the active material changes into a hydroxide salt (such as lithium hydroxide) by the reaction between the active material and moisture, and further the hydroxide salt reacts with carbon dioxide in the atmosphere to produce a carbonate (such as lithium carbonate). Accordingly, "dew-point temperature where the active material deteriorates" may be obtained by measuring the increment of impurity carbon amount of the active material exposed to an atmosphere of a dew-point temperature for a certain time. Specifically, impurity carbon amount with respect to the weight of the active material before being exposed is measured to subsequently expose the active material to an atmosphere of optional dew-point temperature for 7 days and measure impurity carbon amount with respect to the weight of the active material after being exposed. The dew-point temperature at which the increment of the above-mentioned impurity carbon amount of the active material after being exposed with respect to the above-mentioned impurity carbon amount of the active material before being exposed becomes 0.030% or more may be obtained as "dew-point temperature where the active material deteriorates".

More specific dew-point temperature is preferably −30° C. or less.

Furthermore, gas used for the above-mentioned atmosphere is not particularly limited but examples thereof may be an inert gas atmosphere such as nitrogen and argon, or an oxygen atmosphere including oxygen.

(2) Coating Liquid for Coat Layer

The coating liquid for coat layer used for the present step contains an alkoxide compound as a raw material of the ion conductive oxide. Furthermore, the above-mentioned coating liquid for coat layer is ordinarily a sol-gel solution, such as to be in a sol state by hydrolysis and polycondensation reaction of the above-mentioned alkoxide compound and then be in a gel state by the progress of polycondensation reaction and aggregation.

Here, the ion conductive oxide is not particularly limited but preferably an oxide containing at least one kind of elements of at least 3 to 6 families and 13 to 15 families as a raw material element, particularly preferably a lithium complex oxide containing at least one kind of these elements and lithium.

Specifically, an oxide containing at least one kind selected from B, Si, Ti, Zr, V, P, Al, Nb, Ta, Cr, Mo and W is preferable among elements of 3 to 6 families and 13 to 15 families, and a lithium complex oxide containing at least one kind of these elements and lithium is more preferable.

Li-containing oxides such as $LiNbO_3$, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$ and $Li_2WO_4$ are preferable as more specific ion conductive oxide, and $LiNbO_3$ is more preferable among them.

Furthermore, the above-mentioned ion conductive oxide may be a complex compound of the Li-containing oxides. An optional combination of the above-mentioned Li-containing oxides may be adopted as such a complex compound, and examples thereof include $Li_3PO_4$—$Li_4SiO_4$, $Li_3BO_3$—$Li_4SiO_4$ and $Li_3PO_4$—$Li_4GeO_4$.

Furthermore, an oxide solid electrolyte among solid electrolytes used for an all solid state battery may be used as the ion conductive oxide. Specific examples thereof include oxide amorphous solid electrolytes such as $Li_2O$—$B_2O_3$—$P_2O_5$, $Li_2O$—$SiO_2$, $Li_2O$—$B_2O_3$ and $Li_2O$—$B_2O_3$—$ZnO$, and crystalline oxides such as $LiI$—$Al_2O_3$, $Li_5La_3Ta_2O_{12}$, $Li_7La_3Zr_2O_{12}$ and $Li_6BaLa_2Ta_2O_{12}$.

Therefore, the alkoxide compound as a raw material of the above-mentioned ion conductive oxide used for the above-mentioned coating liquid for coat layer is not particularly limited if the alkoxide compound is an alkoxide compound having an element composing the ion conductive oxide. In the case where the ion conductive oxide is represented by a general formula $Li_xAO_y$, the alkoxide compound as a raw material of the ion conductive oxide may be obtained from Li-feeding compound and A-feeding compound. Examples of the Li-feeding compound include Li alkoxide such as ethoxylithium and methoxylithium; lithium acetate; and lithium hydroxide. Furthermore, examples of the A-feeding compound include alkoxide containing A, acetate, and hydroxide. Specifically, in the case where the ion conductive oxide contains Nb, examples of the Nb-feeding compound include Nb alkoxide such as pentaethoxyniobium, pentamethoxyniobium, penta-1-propoxyniobium, penta-n-propoxyniobium, penta-1-butoxyniobium, penta-n-butoxyniobium and penta-sec-butoxyniobium; niobium acetate; and niobium hydroxide. The alkoxide compound as a raw material of the ion conductive oxide is preferably dried.

The above-mentioned coating liquid for coat layer ordinarily contains a solvent except for the above-mentioned alkoxide compound. The above-mentioned solvent is not particularly limited if the solvent may dissolve or disperse the above-mentioned alkoxide compound, but is preferably absolute or dehydrated alcohol. The reason therefor is to allow the active material to be restrained more effectively from deteriorating. Specifically, alcohols such as absolute or dehydrated ethanol, absolute or dehydrated methanol, absolute or dehydrated propanol, and absolute or dehydrated butanol may be used. The moisture amount in absolute or dehydrated alcohol solvent is not particularly limited but is ordinarily preferably 0.005% by weight or less, more preferably 0.0025% by weight or less, particularly preferably 0.00025% by weight or less.

The content of the alkoxide compound as a raw material of the ion conductive oxide in the coating liquid for coat layer is properly determined in accordance with the composition of the coat layer of an intended composite active material. Furthermore, a preparing method of the coating liquid for coat layer is not particularly limited. Furthermore, an atmosphere for preparing the coating liquid for coat layer is not particularly limited but is preferably the same atmosphere as the above-mentioned atmosphere in applying.

(3) Active Material

An active material used for the present step is described. The active material used for the present invention is not particularly limited but in the case where a composite active material produced by the present invention is used for a lithium all solid state battery, examples thereof include lithium cobaltate ($LiCoO_2$), lithium nickelate ($LiNiO_2$), $LiNi_{1/3}Mn_{1/3}Co_{1/3}O_2$, lithium manganate ($LiMn_2O_4$), heterogeneous element substitution Li—Mn spinel represented by $Li_{1+x}Mn_{2-x-y}M_yO_4$ (x+y=2, M=at least one kind selected from Al, Mg, Co, Fe, Ni and Zn), lithium titanate (an oxide containing Li and Ti), lithium metal phosphate ($LiMPO_4$, M=at least one kind selected from Fe, Mn, Co and Ni), transition metal oxide (such as vanadium oxide ($V_2O_5$) and molybdenum oxide ($MoO_3$)), titanium sulfide ($TiS_2$), carbon material (such as graphite and hard carbon), lithium cobalt nitride (LiCoN), lithium silicon oxide (an oxide containing Li and Si), lithium metal (Li), lithium alloy (such as LiM; M=Sn, Si, Al, Ge, Sb and P), lithium storable intermetallic compound (such as storable intermetallic compound containing Mg and M; M=Sn, Ge and Sb, and storable intermetallic compound containing N and Sb; N=In, Cu and Mn), and derivatives thereof.

The active material may be a cathode active material or an anode active material. The cathode active material and the anode active material are not definitely distinguished, and a battery with optional voltage may be constituted by comparing charge-discharge potential of two kinds of compounds to use the compound exhibiting a noble potential and the compound exhibiting a base potential for a cathode and an anode, respectively.

In the present step, an oxide active material is used particularly preferably. The reason therefor is to allow a high-capacity active material. Furthermore, an oxide active material and a sulfide solid electrolyte material react so easily as to form a high resistive layer, so that a composite active material produced by the present invention may be appropriately used for an all solid state battery using a sulfide solid electrolyte material by containing an oxide active material.

Examples of the shape of the active material include a particulate shape; a spherical shape and an elliptic shape are preferable. Furthermore, in the case where the active material is of a particulate shape, an average particle diameter thereof is preferably within a range of 0.1 μm to 50 μm, for example.

(4) Others

Furthermore, a method for applying the coating liquid for coat layer on a surface of the active material is not particularly limited but examples thereof include a fluidized bed coating method, a method for immersing the active material in the coating liquid for coat layer to thereafter dry a solvent, and a method by using a spray drier. In the present step, the fluidized bed coating method is preferably used among them. Here, the fluidized bed coating method is a technique of film coating with the use of a fluidized bed granulating/coating apparatus, which may perform uniform coating by repeating atomizing/drying of the liquid on a particle. Examples of such an apparatus include a multiplex manufactured by POWLEX Co., Ltd. and a flow coater manufactured by Freund Corporation. Furthermore, in atomizing/drying in the fluidized bed granulating/coating apparatus, in order to make the active material into a fluid state, an air current is ordinarily caused in a fluidized bed vessel and a rotor is rotated as required; the conditions of the air current and the rotating conditions of the rotor may be properly determined and are not particularly limited. Ordinarily, the coating liquid for coat layer is dried by the air current in a fluidized bed vessel, so that the air current temperature (gas current temperature) in the vessel is preferably within a range of 40° C. to 100° C. from the viewpoint of efficiently drying the coating liquid for coat layer.

Furthermore, the conditions of atomizing (applying) the coating liquid for coat layer are not particularly limited but the spray velocity may be properly determined.

Film thickness and coverage factor of the applied film are properly determined in accordance with the thickness of an intended coat layer and the coverage factor of the coat layer. The thickness of the coat layer and the coverage factor of the coat layer of a composite active material finally obtained are preferably determined so as to become a value described in the item of the after-mentioned "4. Composite active material".

2. Hydrolysis Promoting Step

Hydrolysis promoting step in the present invention is step of promoting hydrolysis of the above-mentioned alkoxide compound by exposing the above-mentioned applied film under an atmosphere of higher dew-point temperature than dew-point temperature in the above-mentioned applied film forming step.

The dew-point temperature in the present step may be higher than the dew-point temperature in the above-mentioned applied film forming step, and a difference between the dew-point temperature of the present step and the dew-point temperature in the above-mentioned applied film forming step is preferably 10° C. or more, more preferably 20° C. or more, particularly preferably 30° C. or more. The reason therefor is that the case where the difference in the above-mentioned dew-point temperature is less than the above-mentioned range brings a possibility that the hydrolysis of the alkoxide compound does not sufficiently proceed to increase the impurity carbon amount in the coat layer finally obtained. Furthermore, the upper limit of the difference in the above-mentioned dew-point temperature is not particularly limited but is approximately 80° C., for example.

In the present invention, hydrolysis promoting step is preferably performed under a humidified atmosphere. The reason therefor is to allow the hydrolysis of the alkoxide compound to be sufficiently promoted. "Humidified atmosphere" signifies a state such that the dew-point temperature is higher than dew-point temperature in the atmospheric environment in performing hydrolysis promoting step. Furthermore, the humidified atmosphere may be easily formed by using humidified gas.

Specifically, the dew-point temperature in hydrolysis promoting step is preferably 0° C. or more, more preferably within a range of 0° C. to 50° C., particularly preferably within a range of 5° C. to 20° C. The reason therefor is that the case where the above-mentioned dew-point temperature is less than the above-mentioned range brings a possibility that the hydrolysis of the alkoxide compound does not sufficiently proceed to increase the impurity carbon amount in the coat layer finally obtained. Furthermore, the upper limit of the above-mentioned dew-point temperature is not particularly limited but is approximately 50° C.

Furthermore, gas used for the above-mentioned atmosphere is not particularly limited but examples thereof may be an inert gas atmosphere such as nitrogen and argon, or an oxygen atmosphere including oxygen. Among them, in the present invention, hydrolysis promoting step is performed preferably in an atmosphere such that at least one of oxygen and carbon dioxide is smaller in amount as compared with the air, more preferably under an inert gas atmosphere. For example, the reason therefor is that deterioration of the applied film by oxygen and carbon dioxide may be restrained. Furthermore, in the case of performing hydrolysis promoting step under an inert gas atmosphere, the ratio of impurities (gas component except inert gas and moisture) is, for example, preferably 10000 ppm or less, more preferably 1000 ppm or less.

The exposure time in the present step is not particularly limited if the exposure time is a time for allowing the alkoxide compound in the applied film to be sufficiently hydrolyzed, but is preferably within a range of 1 hour to 220 hours, more preferably within a range of 3 hours to 36 hours, particularly preferably within a range of 4 hours to 30 hours.

In the present step, the hydrolysis of the alkoxide compound in the applied film is preferably completed. The reason therefor is that the presence of the unreacted alkoxide compound causes the impurities contained in the coat layer of the obtained composite active material.

The completion of the hydrolysis reaction of the alkoxide compound may be examined in such a manner that chemical analysis such as gas chromatography and infrared spectroscopic analysis using the coating liquid for coat layer, and physical methods such as viscoelasticity measurement and film formability evaluation of glass on a substrate are performed after preparing the above-mentioned coating liquid for coat layer, which is exposed in the same atmosphere for the same time as the above-mentioned applied film. It is conceived that if the hydrolysis of the coating liquid for coat layer is completed, the alkoxide compound and the conductive ion source compound are absent in the solvent, and the coating liquid for coat layer is of uniform composition.

In the present step, a polymerization reaction of an alkoxide hydrolysate ordinarily proceeds after the hydrolysis of the alkoxide compound.

3. Heat-Treating Step

Heat-treating step in the present invention is step of forming the above-mentioned coat layer by heat-treating the applied film after the above-mentioned hydrolysis promoting step.

The heat-treating temperature in the present step is not particularly limited if the heat-treating temperature is a temperature for allowing an intended coat layer to be formed, but is, for example, preferably within a range of 300° C. to 500° C., more preferably within a range of 350° C. to 450° C., particularly preferably within a range of 350° C. to 400° C. The reason therefor is that the case where the above-mentioned heat-treating temperature is less than the range brings a possibility that sufficient heat treatment may not be performed and an intended coat layer is not obtained, while the case where the above-mentioned heat-treating temperature is more than the range brings a possibility of causing the deterioration of the active material.

The atmosphere in performing heat treatment is not particularly limited if the atmosphere is an atmosphere including oxygen so as to allow the ion conductive oxide. Examples thereof include an atmosphere under the air.

The heat-treating time in the present step is not particularly limited if the heat-treating time is a time for allowing an intended coat layer to be formed, but is, specifically, preferably 0.5 hour or more, more preferably within a range of 0.5 hour to 48 hours, and particularly preferably within a range of 1 hour to 20 hours. The heat-treating method in the present step is not particularly limited if the heat-treating method is a method for allowing heat treatment to be performed under the above-mentioned atmosphere, but examples thereof include a method using a burning furnace. The burning furnace is not particularly limited if the burning furnace is a burning furnace for allowing heat treatment to be performed under an intended atmosphere, but a muffle furnace may be appropriately used, for example.

4. Composite Active Material

The composite active material produced by a producing method of the present invention has the above-mentioned active material and coat layer. The average thickness of the above-mentioned coat layer is not particularly limited if the average thickness is a thickness such as to allow the active material and a solid electrolyte material to be restrained from reacting in using the above-mentioned composite active material for an all solid state battery, but is, for example, preferably within a range of 1 nm to 500 nm, more preferably within a range of 2 nm to 100 nm. The reason therefor is that the case where the coat layer is too thick brings a possibility of deteriorating ion conductivity and electron conductivity, while the case where the coat layer is too thin brings a possibility that the active material and the solid electrolyte material react. The thickness of the coat layer may be measured by observation (such as n≥100) with a transmission electron microscope (TEM), for example.

The form of the coat layer is not particularly limited if the coat layer is formed on a surface of the active material, but preferably covers a surface of the active material, for example. The coverage factor of the coat layer on a surface of the active material is preferably high for the purpose of restraining interface resistance from increasing, specifically, preferably 50% or more, more preferably 80% or more. Furthermore, the coat layer may cover the whole surface of the active material. The coverage factor of the coat layer may be measured by using a transmission electron microscope (TEM) and an X-ray photoelectron spectroscopy (XPS), for example.

The above-mentioned composite active material may restrain interface resistance between the composite active material and the solid electrolyte material from increasing by reason of being used for an all solid state battery. Examples of the above-mentioned all solid state battery include a lithium all solid state battery, a sodium all solid state battery, a magnesium all solid state battery and a calcium all solid state battery, more preferably a lithium all solid state battery and a sodium all solid state battery, particularly preferably a lithium all solid state battery. Furthermore, an all solid state battery using a sulfide solid electrolyte material is preferable among lithium all solid state batteries. The reason therefor is that a sulfide solid electrolyte material is excellent in ion conductivity. Furthermore, a sulfide solid electrolyte material is so high in reactivity as to easily react with the above-mentioned active material to form a high resistive layer. Therefore, the use of the composite active material obtained by a producing method of the present invention with a sulfide solid electrolyte material allows the formation of the high resistive layer to be appropriately restrained.

Furthermore, the above-mentioned all solid state battery may be a primary battery or a secondary battery, preferably a secondary battery among them. The reason therefor is to be repeatedly chargeable and dischargeable and be useful as a car-mounted battery, for example. Examples of the shape of the above-mentioned all solid state battery include a coin shape, a laminate shape, a cylindrical shape and a rectangular shape.

Furthermore, a producing method of the above-mentioned all solid state battery is not particularly limited if the producing method is a method such as to allow the above-mentioned all solid state battery, but the same method as a producing method of a general all solid state battery may be used. Examples of a producing method of the all solid state battery include a method such that a material composing the above-mentioned cathode active material layer, a material forming a solid electrolyte layer and a material forming an anode active material layer are sequentially pressed to thereby produce a power generating element and this power generating element is stored inside a battery case, which is crimped.

5. Others

In the present invention, a composite active material such that the coat layer is formed on a surface of the active material by a sol-gel method may be obtained through the above-mentioned steps. The sol-gel method may easily form the coat layer such as to cover more areas of a surface of the active material by reason of being a wet method using a solvent-based precursor. Furthermore, by reason of being a chemical method, the sol-gel method allows a composite active material such that the bonding of the active material and the coat layer is so strong that the coat layer formed so as to cover a surface of the active material is peeled off with difficulty, as compared with a method of covering by mechanical physical force such as mechanical milling.

B. Coating Apparatus

A coating apparatus of the present invention is a coating apparatus including a process chamber, and a fluidizing gas feed unit and a fluidizing gas exhausting unit connected to the above-mentioned process chamber, characterized in that a coating liquid feed unit to feed a coating liquid for coat layer, containing an alkoxide compound as a raw material of an ion conductive oxide, and a hydrolysis promoting fluid feed unit, located on a downstream side from the coating liquid feed unit in a flow direction of the fluidizing gas, to feed a hydrolysis promoting fluid for promoting hydrolysis of the above-mentioned alkoxide compound are connected to the above-mentioned process chamber.

Figure 4:
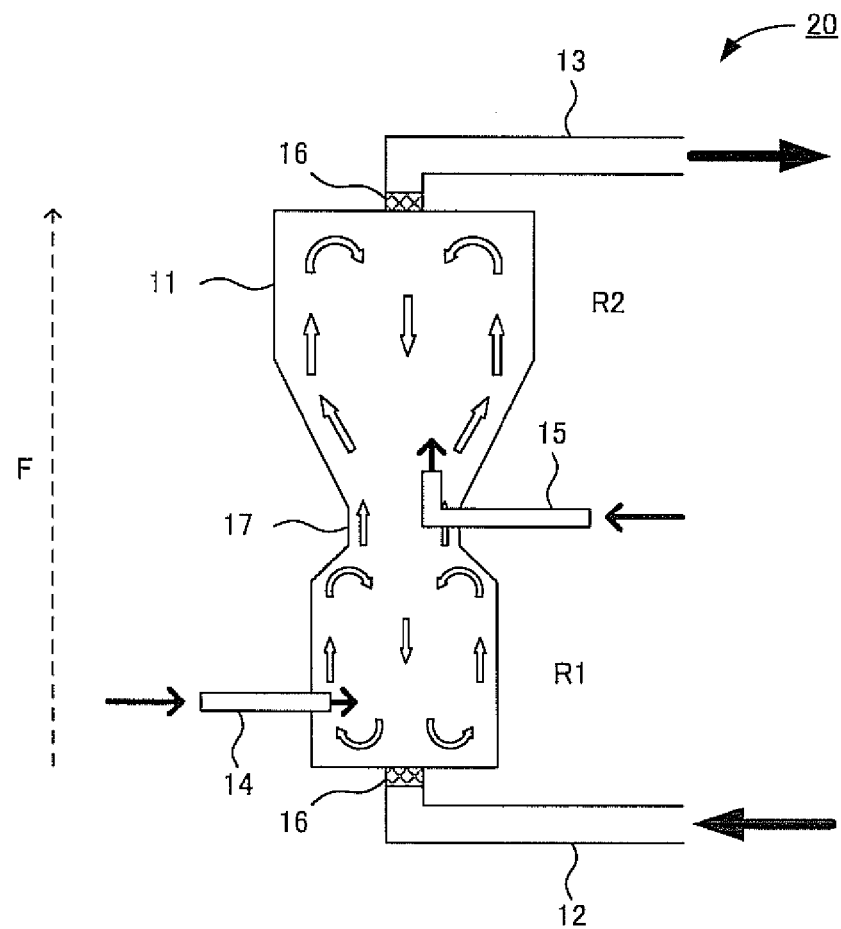
FIG. 4 is a schematic cross-sectional view showing an example of a coating apparatus of the present invention.

FIG. 4 is a schematic cross-sectional view showing an example of the coating apparatus of the present invention. In FIG. 4, a coating apparatus 20 includes a process chamber 11, and a fluidizing gas feed unit 12 and a fluidizing gas exhausting unit 13 connected to the process chamber 11. In addition, a coating liquid feed unit 14 and a hydrolysis promoting fluid feed unit 15 located on the downstream side from the coating liquid feed unit 14 in a flow direction F of the fluidizing gas are connected to the process chamber 11. The coating liquid feed unit 14 feeds a coating liquid for coat layer, containing an alkoxide compound as a raw material of an ion conductive oxide to the process chamber 11. Furthermore, the hydrolysis promoting fluid feed unit 15 feeds a hydrolysis promoting fluid for promoting hydrolysis of the alkoxide compound to the process chamber 11. In the present invention, the upstream side and the downstream side in a flow direction of the fluidizing gas are occasionally referred to as simply the upstream side and the downstream side, respectively.

Furthermore, the fluidizing gas fed from the fluidizing gas feed unit 12 passes through the process chamber 11 and is exhausted from the fluidizing gas exhausting unit 13. A solid-gas separation filter 16 is provided for each of a boundary between the fluidizing gas feed unit 12 and the process chamber 11, and a boundary between the process chamber 11 and the fluidizing gas exhausting unit 13. In the process chamber 11, the upstream side from the hydrolysis promoting fluid feed unit 15 is ordinarily an applied film forming region $R_1$ and the downstream side from the hydrolysis promoting fluid feed unit is ordinarily a hydrolysis promoting region $R_2$.

In each of the applied film forming region $R_1$ and the hydrolysis promoting region $R_2$, a convection current of the fluidizing gas is caused, while the flow of the fluidizing gas in the process chamber 11 is basically one direction from the fluidizing gas feed unit 12 toward the fluidizing gas exhausting unit 13. Thus, the hydrolysis promoting fluid does not invade the applied film forming region $R_1$ and the coating liquid is not exposed to the hydrolysis promoting fluid. If the hydrolysis promoting fluid invades the applied film forming region $R_1$, the problem is that the fluidity of the active material deteriorates due to the influence of humidity. Furthermore, if the coating liquid is exposed to the hydrolysis promoting fluid, the problem is that hydrolysis proceeds excessively before coating and the coating liquid gelates. The present invention has the advantage that the above-mentioned problems are not caused for the reason that the hydrolysis promoting fluid does not invade the applied film forming region $R_1$. Furthermore, for example, when the humidity of the fluidizing gas is sufficiently decreased, the applied film forming region $R_1$ may be maintained in a low-humidity environment. Thus, the fluidity of the active material may be kept so high that a uniform applied film may be formed on a surface of the active material.

Thus, according to the present invention, the composite active material, which offers less deterioration of the active material and smaller impurity carbon amount in the coat layer, may be efficiently formed by providing the hydrolysis promoting fluid feed unit on the downstream side from the coating liquid feed unit in a flow direction of the fluidizing gas.

The coating apparatus of the present invention is hereinafter described in each constitution.

1. Process Chamber

The process chamber in the present invention forms the applied film on the upstream side and promotes hydrolysis of the applied film on the downstream side.

The shape of the process chamber is not particularly limited and an optional shape may be adopted. Among them, in the present invention, as shown in FIG. 4, the process chamber 11 preferably has a neck-in portion 17 with a locally small diameter. For example, the reason therefor is that the upstream side from the neck-in portion and the downstream side from the neck-in portion may be used as the applied film forming region $R_1$ and the hydrolysis promoting region $R_2$, respectively. This case causes a convection current of the fluidizing gas in each of the regions to have the advantages that the applied film is uniformly formed and hydrolysis of the applied film is uniformly caused.

2. Fluidizing Gas Feed Unit and Fluidizing Gas Exhausting Unit

The fluidizing gas feed unit in the present invention feeds the fluidizing gas to the process chamber. Furthermore, the fluidizing gas exhausting unit in the present invention exhausts the fluidizing gas from the process chamber.

The fluidizing gas feed unit and the fluidizing gas exhausting unit are connected to the process chamber. The positional relationship between the fluidizing gas feed unit and the fluidizing gas exhausting unit is not particularly limited but the fluidizing gas feed unit and the fluidizing gas exhausting unit are preferably disposed so that the fluidizing gas stays long in a reaction chamber. That is to say, a feed opening of the fluidizing gas feed unit and an exhaust opening of the fluidizing gas exhausting unit are preferably placed as away as possible. In particular, in the present invention, as shown in FIG. 4, a feed opening of the fluidizing gas feed unit 12 and an exhaust opening of the fluidizing gas exhausting unit 13 are preferably provided so as to be opposed.

Furthermore, each of a feed opening of the fluidizing gas feed unit 12 and an exhaust opening of the fluidizing gas exhausting unit 13 may be provided on the top face of the process chamber, the bottom face of the process chamber, or the side face of the process chamber. In FIG. 4, a feed opening of the fluidizing gas feed unit 12 is provided on the bottom face of the process chamber 11, and an exhaust opening of the fluidizing gas exhausting unit 13 is provided on the top face of the process chamber 11. Furthermore, as not shown in FIG. 4, each of a feed opening of the fluidizing gas feed unit 12 and an exhaust opening of the fluidizing gas exhausting unit 13 may be provided on the opposite side face of the process chamber 11.

Furthermore, kinds of the fluidizing gases are not particularly limited but are preferably gases capable of forming a desired atmosphere in the above-mentioned applied film forming step.

3. Hydrolysis Promoting Fluid Feed Unit

The hydrolysis promoting fluid feed unit in the present invention is located on the downstream side from the coating liquid feed unit in a flow direction of the fluidizing gas to feed a hydrolysis promoting fluid for promoting hydrolysis of the alkoxide compound.

In the present invention, the flow direction of the fluidizing gas signifies a direction such that the fluidizing gas fed to the process chamber flows until being exhausted from the process chamber; ordinarily, a convection current is not considered.

Kinds of the hydrolysis promoting fluids are not particularly limited but are ordinarily fluids capable of forming a desired atmosphere in the above-mentioned hydrolysis promoting step. The hydrolysis promoting fluid ordinarily contains moisture and may be gaseous, misty, liquid or a mixture thereof. The hydrolysis promoting fluid is preferably gas containing moisture of saturated vapor pressure or less from the viewpoint of uniformity of the hydrolysis reaction.

Furthermore, examples of a method of feeding the hydrolysis promoting fluid by the hydrolysis promoting fluid feed unit include a method using a nozzle such as a two-fluid nozzle and a method using a misting apparatus by heat or supersonic wave. Furthermore, a feeding direction of the hydrolysis promoting fluid by the hydrolysis promoting fluid feed unit is not particularly limited but an optional direction may be selected therefor. Among them, in the present invention, the feeding direction of the hydrolysis promoting fluid is preferably a direction not toward the applied film forming region $R_1$, more preferably a direction along the flow direction of the fluidizing gas. The reason therefor is that the problem that the coating liquid gelates is caused with difficulty.

4. Coating Liquid Feed Unit

The coating liquid feed unit in the present invention feeds a coating liquid for coat layer, containing an alkoxide compound as a raw material of an ion conductive oxide. The coating liquid for coat layer is the same as the above-mentioned contents; therefore, the description herein is omitted.

Furthermore, in the present invention, only the coating liquid for coat layer may be fed from the coating liquid feed unit, or the coating liquid for coat layer may be fed while dispersed by spray gas. In the case of the latter, more uniform applied film may be formed.

Furthermore, examples of a method of feeding the coating liquid for coat layer by the coating liquid feed unit include a method using a nozzle such as a two-fluid nozzle and a method using a misting apparatus by heat or supersonic wave. Furthermore, a feeding direction of the coating liquid for coat layer by the coating liquid feed unit is not particularly limited but an optional direction may be selected therefor.

5. Coating Apparatus

The coating apparatus of the present invention may include at least one of a heating unit to heat the process chamber and a cooling unit to cool the process chamber. The temperature in the above-mentioned applied film forming step and hydrolysis promoting step may be controlled by providing at least one of the heating unit and the cooling unit. Furthermore, the above-mentioned heat-treating step may be performed by the heating unit. The heating method is not particularly limited but examples thereof include a method of contacting the process chamber with an exothermic body and a method of heating the process chamber in a noncontact manner. Examples of the latter include heating by infrared irradiation and heating by microwave irradiation. Furthermore, the cooling method is not particularly limited but examples thereof include a method of contacting the process chamber with an endothermic body.

Furthermore, the coating apparatus of the present invention may include a rotating unit to rotate the process chamber. The rotating unit brings the advantages that the applied film is uniformly formed and hydrolysis of the applied film is uniformly caused.

C. Composite Active Material

Next, a composite active material of the present invention is described. The composite active material of the present invention may be roughly divided into two embodiments. The composite active material of the present invention is described while divided into a first embodiment and a second embodiment.

1. First Embodiment

The composite active material of the first embodiment is a composite active material having an active material and a coat layer containing an ion conductive oxide and formed on a surface of the above-mentioned active material, characterized in that an impurity carbon amount is less than 1.56% by weight with respect to the above-mentioned coat layer.

According to the first embodiment, the impurity carbon amount is so small as to allow the composite active material with low reaction resistance. It is presumed that the reason why reaction resistance decreases is that the decrease of the impurity carbon amount in the coat layer improves ion conductance. The active material and the coat layer in the first embodiment are basically the same as the contents described in the above-mentioned "A. Producing method of composite active material".

Furthermore, the first embodiment is characterized in that the impurity carbon amount with respect to the weight of the coat layer is in a predetermined range. Here, the impurity carbon amount with respect to the weight of the composite active material is defined as A, and the impurity carbon amount with respect to the weight of the coat layer is defined as $A_2$. The impurity carbon amount $A_1$ may be determined by using a carbon analyzer, for example. Specifically, the impurity carbon amount $A_1$ may be prescribed in such a manner that the composite active material is heated in a high-frequency furnace while feeding oxygen to detect carbon dioxide ($CO_2$) and carbon monoxide (CO) produced by heating with a nondispersive infrared detector. Examples of the carbon analyzer include a carbon/sulfur analyzer EMIA-820 manufactured by Horiba, Ltd. On the other hand, the impurity carbon amount $A_2$ may be calculated in such a manner that the absolute amount of the impurity carbon calculated from A1s divided by the weight of the coat layer. The weight of the coat layer may be calculated from average thickness and average coverage factor of the coat layer calculated from an electron microscope photograph, for example. More sample numbers are more preferable, for example, 100 or more. Furthermore, the weight of the coat layer may be calculated from the feed amount of the coat layer.

The value of the impurity carbon amount $A_2$ is ordinarily less than 1.56% by weight, preferably 1.10% by weight or less, more preferably 0.85% by weight or less.

The value of the impurity carbon amount $A_1$ is not particularly limited but is, for example, preferably less than 0.069% by weight, more preferably 0.050% by weight or less, even more preferably 0.035% by weight or less.

Furthermore, the composite active material of the first embodiment may be used for an optional battery. That is to say, the composite active material may be used for a battery having a solid electrolyte material, a battery having a liquid electrolyte, or a battery having a polymer electrolyte material.

Furthermore, the composite active material of the first embodiment is preferably obtained by each step described in "A. Producing method of composite active material". That is to say, the composite active material of the first embodiment is preferably obtained by the above-mentioned applied film forming step, hydrolysis promoting step and heat-treating step. In addition, in this case, the impurity carbon amount $A_1$ or the impurity carbon amount $A_2$ are preferably within the above-mentioned range.

2. Second Embodiment

The composite active material of the second embodiment is a composite active material having an active material and a coat layer containing an ion conductive oxide and formed on a surface of the above-mentioned active material, characterized in that a lithium carbonate amount is less than 0.075% by weight with respect to the above-mentioned active material.

According to the second embodiment, the lithium carbonate amount is so small as to allow the composite active material with low reaction resistance. It is presumed that the reason why reaction resistance decreases is that the decrease of the lithium carbonate amount on an interface between the active material and the coat layer improves ion conductance. The active material and the coat layer in the second embodiment are basically the same as the contents described in the above-mentioned "A. Producing method of composite active material". Furthermore, the composite active material of the second embodiment may have characteristics of the above-mentioned composite active material of the first embodiment.

Furthermore, the second embodiment is characterized in that the lithium carbonate amount with respect to the weight of the active material is in a predetermined range. Here, the lithium carbonate amount with respect to the weight of the active material is defined as $B_1$. The absolute amount of the lithium carbonate may be determined by ion chromatography. First, ion-exchange water as a mobile phase is added to the composite active material, stirred and filtered to prepare an evaluation solution. Thereafter, measurement is performed by using ion-exchange resin for a stationary phase. Thus, the absolute amount of a carbonate ion is obtained to obtain the absolute amount as the lithium carbonate. The lithium carbonate amount $B_1$ may be calculated in such a manner that the absolute amount as the obtained lithium carbonate is divided by the weight of the active material.

The value of the lithium carbonate amount $B_1$ is ordinarily less than 0.075% by weight, preferably 0.060% by weight or less, more preferably 0.040% by weight or less.

Furthermore, the composite active material of the second embodiment is preferably obtained by each step described in "A. Producing method of composite active material". That is to say, the composite active material of the second embodiment is preferably obtained by the above-mentioned applied film forming step, hydrolysis promoting step and heat-treating step. In addition, in this case, the lithium carbonate amount $B_1$ is preferably within the above-mentioned range. Other items are basically the same as the contents described in the above-mentioned first embodiment.

D. All Solid State Battery

Next, an all solid state battery of the present invention is described. The all solid state battery of the present invention has a cathode active material layer, an anode active material layer, and a solid electrolyte layer formed between the above-mentioned cathode active material layer and the above-mentioned anode active material layer, characterized in that at least one of the above-mentioned cathode active material layer and the above-mentioned anode active material layer contains the above-mentioned composite active material.

Figure 5:
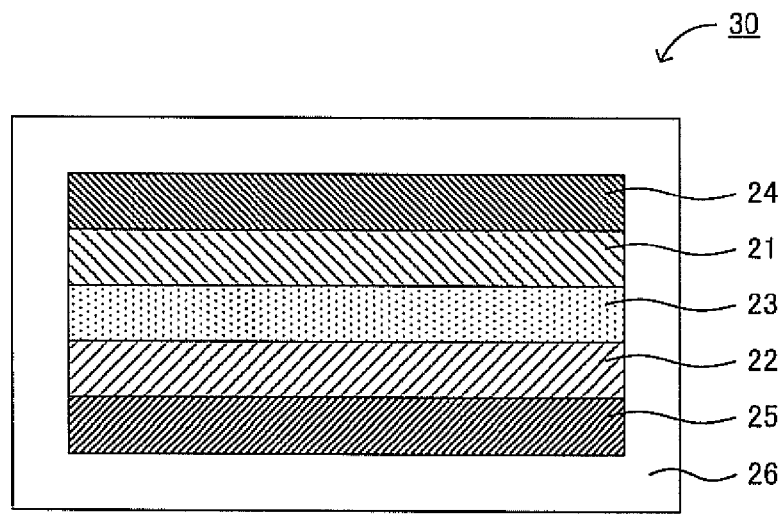
FIG. 5 is a schematic cross-sectional view showing an example of an all solid state battery of the present invention.

FIG. 5 is a schematic cross-sectional view showing an example of the all solid state battery of the present invention. As shown in FIG. 5, an all solid state battery 30 of the present invention has a cathode active material layer 21 containing a cathode active material, an anode active material layer 22 containing an anode active material, a solid electrolyte layer 23 formed between the cathode active material layer 21 and the anode active material layer 22, a cathode current collector 24 for performing current collecting of the cathode active material layer 21, an anode current collector 25 for performing current collecting of the anode active material layer 22, and a battery case 26 for storing these members. The present invention is greatly characterized in that at least one of the cathode active material layer 21 and the anode active material layer 22 contains the composite active material described in "C. Composite active material".

According to the present invention, the use of the above-mentioned composite active material allows the battery with low reaction resistance.

The all solid state battery of the present invention is hereinafter described in each constitution.

1. Cathode Active Material Layer

The cathode active material layer in the present invention is a layer containing at least a cathode active material, and may contain at least one of a solid electrolyte material, a conductive material and a binder, as required. Among them, in the present invention, the cathode active material layer preferably contains the above-mentioned composite active material.

Furthermore, in the present invention, the cathode active material layer preferably contains a solid electrolyte material, more preferably a sulfide solid electrolyte material. The reason therefor is to allow the cathode active material layer with high ion conductivity. Furthermore, for example, the use of an oxide active material and a sulfide solid electrolyte material by combination causes both of them to react to form a high resistive layer on an interface therebetween. On the contrary, the above-mentioned composite active material has the coat layer to thereby have the advantage that the reaction of both may be restrained. The same material as the solid electrolyte material used for the after-mentioned solid electrolyte layer may be used for the solid electrolyte material used for the cathode active material layer. The content of the cathode active material in the cathode active material layer is, for example, preferably 10% by weight or more, more preferably within a range of 20% by weight to 90% by weight.

The cathode active material layer may further contain a conductive material. The addition of the conductive material allows electron conductivity of the cathode active material layer to be improved. Examples of the conductive material include acetylene black, Ketjen Black and carbon fiber. Furthermore, the cathode active material layer may contain a binder. Examples of kinds of the binders include a fluorine-containing binder such as polytetrafluoroethylene (PTFE). Furthermore, the thickness of the cathode active material layer is preferably within a range of 0.1 μm to 1000 μm, for example.

2. Anode Active Material Layer

The anode active material layer in the present invention is a layer containing at least an anode active material, and may contain at least one of a solid electrolyte material, a conductive material and a binder, as required. Among them, in the present invention, the anode active material layer preferably contains the above-mentioned composite active material.

Furthermore, in the present invention, the anode active material layer preferably contains a solid electrolyte material, more preferably a sulfide solid electrolyte material. The reason therefor is to allow the anode active material layer with high ion conductivity. The same material as the solid electrolyte material used for the after-mentioned solid electrolyte layer may be used for the solid electrolyte material used for the anode active material layer. Furthermore, in the case where the cathode active material layer contains the above-mentioned composite active material, the anode active material layer may contain a general anode active material. Examples of the general anode active material include a metal active material and a carbon active material. Examples of the metal active material include In, Al, Si, and Sn. On the other hand, examples of the carbon active material include meso-carbon microbeads (MCMB), high orientation property graphite (HOPG), hard carbon and soft carbon. The content of the anode active material in the anode active material layer is, for example, preferably 10% by weight or more, more preferably within a range of 20% by weight to 90% by weight.

A conductive material and a binder used for the anode active material layer are the same as the case of the above-mentioned cathode active material layer. The thickness of the anode active material layer is preferably within a range of 0.1 µm to 1000 µm, for example.

3. Solid Electrolyte Layer The solid electrolyte layer in the present invention is a layer formed between the cathode active material layer and the anode active material layer. The solid electrolyte layer contains at least a solid electrolyte material. Examples of the solid electrolyte material include a sulfide solid electrolyte material and an oxide solid electrolyte material. Examples of the sulfide solid electrolyte material having Li ion conductivity include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers. Z is any one of Ge, Zn and Ga.), $Li_2S$—$GeS_2$, $Li_2S$—$SiS_2$—$Li_3PO_4$, and $Li_2S$—$SiS_2$—$Li_xMO_y$ (in which x and y are positive numbers. M is any one of P, Si, Ge, B, Al, Ga and In.). The description of the above-mentioned "$Li_2S$—$P_2S_5$" signifies the sulfide solid electrolyte material obtained by using a raw material composition containing $Li_2S$ and $P_2S_5$, and other descriptions are the same.

On the other hand, examples of the oxide solid electrolyte material having Li ion conductivity include a compound having a NASICON type structure. Examples of the compound having a NASICON type structure include a compound (LAGP) represented by a general formula $Li_{1+x}Al_xGe_{2-x}(PO_4)_3$ ($0 \leq x \leq 2$) and a compound (LATP) represented by a general formula $Li_{1+x}Al_xTi_{2-x}(PO_4)_3$ ($0 \leq x \leq 2$). Furthermore, other examples of the oxide solid electrolyte material include LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$).

The content of the solid electrolyte material in the solid electrolyte layer is, for example, preferably 60% by weight or more, more preferably 70% by weight or more, even more preferably 80% by weight or more. The solid electrolyte layer may contain a binder or consist of only the solid electrolyte material. The thickness of the solid electrolyte layer is, for example, preferably within a range of 0.1 µm to 1000 µm, more preferably within a range of 0.1 µm to 300 µm.

4. Other Constitutions

An all solid state battery of the present invention has at least the cathode active material layer, the anode active material layer and the solid electrolyte layer; ordinarily further having a cathode current collector for performing current collecting of the cathode active material layer and an anode current collector for performing current collecting of the anode active material layer. Examples of a material for the cathode current collector include SUS, aluminum, nickel, iron, titanium and carbon. On the other hand, examples of a material for the anode current collector include SUS, copper, nickel and carbon. The thickness and shape of the cathode current collector and the anode current collector are preferably selected properly in accordance with uses of the battery. Furthermore, a battery case of a general battery may be used for a battery case. Examples of the battery case include a battery case made of SUS.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing Examples and Comparative Examples hereinafter.

Example 1

(Preparation of Coating Liquid for Coat Layer)

A coating liquid for coat layer was prepared under a nitrogen atmosphere (dew-point temperature: −30° C.) in the following manner. First, ethoxylithium (manufactured by Kojundo Chemical Lab. Co., Ltd.) was dissolved and uniformly dispersed into dehydrated ethanol (manufactured by Wako Pure Chemical Industries, Ltd.), and thereafter pentaethoxyniobium (manufactured by Kojundo Chemical Lab. Co., Ltd.) was added thereto so that lithium and niobium was 1:1 at element ratio, and stirred until uniformly mixed. The projected amount of the ethoxylithium was adjusted so that the solid content ratio of the solution was 6.9% by weight.

(Production of Composite Active Material)

680 g of the above-mentioned coating liquid for coat layer was sprayed on 1 kg of a cathode active material $LiNi_{1/3}Mn_{1/3}Co_{1/3}O_2$ (manufactured by Nichia Corporation) by using a coating apparatus MP-01 (manufactured by Powrex Corp.) to form an applied film on the surface of the above-mentioned cathode active material. The operating conditions of the above-mentioned coating apparatus were intake gas: nitrogen (dew-point temperature: −40° C.), intake gas temperature: 80° C., intake gas volume: 0.3 m³/h, number of rotor revolutions: 300 rpm, spray velocity: 1.5 g/min. After completing the coating, the above-mentioned applied film was exposed to the air (dew-point temperature: 0° C.) for 24 hours to perform hydrolysis promoting step. After hydrolysis promoting step, burning was performed at a temperature of 350° C. for 5 hours. A composite active material was obtained in the above-mentioned manner.

(Production of Sulfide Solid Electrolyte Material)

$Li_2S$ (manufactured by NIPPON CHEMICAL INDUSTRIAL CO., LTD.) and $P_2S_5$ (manufactured by Sigma-Aldrich Co. LLC.) were used as a starting material. Next, $Li_2S$ and $P_2S_5$ were weighed in a glove box under an Ar atmosphere (dew-point temperature: −70° C.) so as to be a molar ratio of $75Li_2S \cdot 25P_2S_5$ ($Li_3PS_4$, ortho-composition), and mixed with an agate mortar for 5 minutes to obtain 2 g of a raw material composition ($Li_2S$=0.7656 g, $P_2S_5$=1.2344 g). 2 g of this raw material composition was projected into a vessel of planetary ball mill (45 cc, made of $ZrO_2$), dehydrated heptane (a moisture amount of 30 ppm or less, 4 g) was projected thereinto, and a $ZrO_2$ ball ($\phi$=5 mm, 53 g) was projected thereinto to hermetically seal the vessel completely (Ar atmosphere). This vessel was mounted on a planetary ball mill machine (P7 manufactured by FRITSCH JAPAN CO, LTD.) to perform mechanical milling at the number of soleplate revolutions of 370 rpm for 40 hours. Thereafter, the obtained test sample was dried in a vacuum to obtain a glass-state sulfide solid electrolyte material.

(Production of all Solid State Battery)

The above-mentioned composite active material and the above-mentioned sulfide solid electrolyte material of 6:4 (volume ratio), VGCF (manufactured by Showa Denko K.K.) of 3% (weight ratio) as a conductive assistant, and butylene rubber (manufactured by JSR Corporation) of 0.7% (weight ratio) as a binder were projected into heptane to prepare cathode slurry. The above-mentioned cathode slurry was dispersed by a supersonic homogenizer, thereafter coated on an aluminum foil, dried at a temperature of 100° C. for 30 minutes, thereafter die-cut into 1 cm², and regarded as a cathode electrode.

An anode active material (layered carbon) and the above-mentioned sulfide solid electrolyte material of 6:4 (volume ratio), and butylene rubber of 1.2% (weight ratio) as a binder were projected into heptane to prepare anode slurry. The slurry was dispersed by a supersonic homogenizer, thereafter coated on a copper foil, dried at a temperature of 100° C. for 30 minutes, thereafter die-cut into 1 cm², and regarded as an anode electrode.

64.8 mg of the above-mentioned sulfide solid electrolyte material was put in a cylindrical ceramic with an inside cross-sectional area of 1 cm², smoothed and pressed at a pressure of 1 ton to form a solid electrolyte layer. The above-mentioned cathode electrode and anode electrode were put on both faces thereof and pressed at a pressure of 4.3 tons for 1 minute, and thereafter a stainless stick was put in both electrodes and bound at a pressure of 1 ton to obtain a battery.

An all solid state battery was obtained in the above-mentioned manner.

Comparative Example 1

An all solid state battery was obtained in the same manner as Example 1 except for not performing the above-mentioned hydrolysis promoting step after completing the coating by applying the above-mentioned alkoxide solution on the surface of the above-mentioned cathode active material during the production of the composite active material.

[Evaluation 1]

Figure 6:
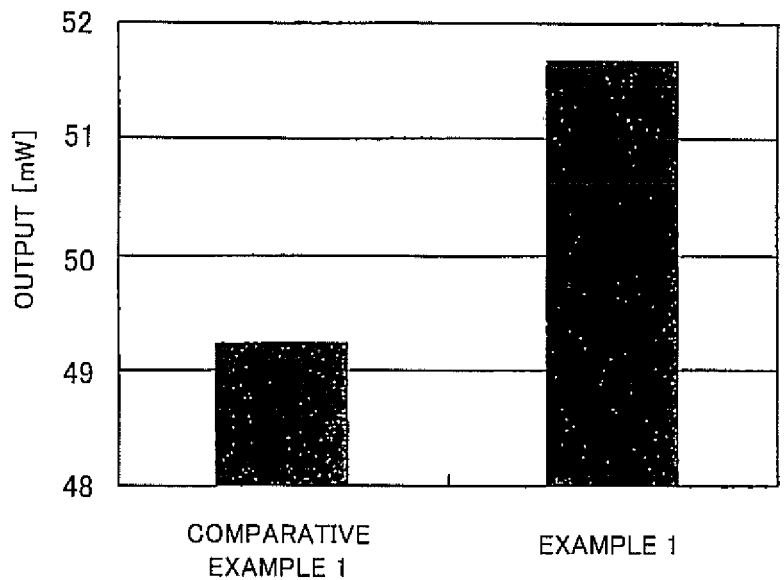
FIG. 6 is a graph showing an output of a battery of Example 1 and Comparative Example 1.

The obtained all solid state battery was charged up to a voltage of 4.55 V and thereafter discharged to 2.5 V to thereafter measure a five-second output at a voltage of 3.6 V. The output of the battery of Example 1 was 51.7 mW and the output of the battery of Comparative Example 1 was 49.2 mW. The results are shown in FIG. 6.

Figure 7:
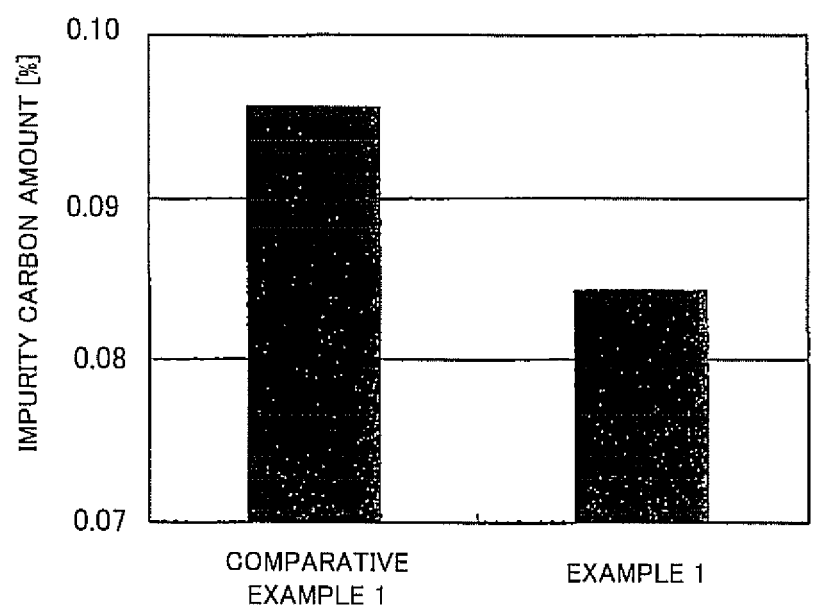
FIG. 7 is a graph showing impurity carbon amount contained in a composite active material of Example 1 and Comparative Example 1.

Furthermore, with regard to the composite active material of Example 1 and the composite active material of Comparative Example 1, the impurity carbon amount contained in the coat layer was measured by the following measuring method. That is to say, the composite active material was measured by a carbon/sulfur analyzer EMIA-820 (manufactured by Horiba, Ltd.) to measure the impurity carbon amount $A_1$ with respect to the weight of the composite active material. The impurity carbon amount $A_1$ of the composite active material of Example 1 was 0.084% by weight, and the impurity carbon amount $A_1$ of the composite active material of Comparative Example 1 was 0.096% by weight. The results are shown in FIG. 7. Thus, in the present invention, the impurity carbon amount $A_1$ contained in the coat layer is preferably 0.090% by weight or less.

Reference Example

Figure 8:
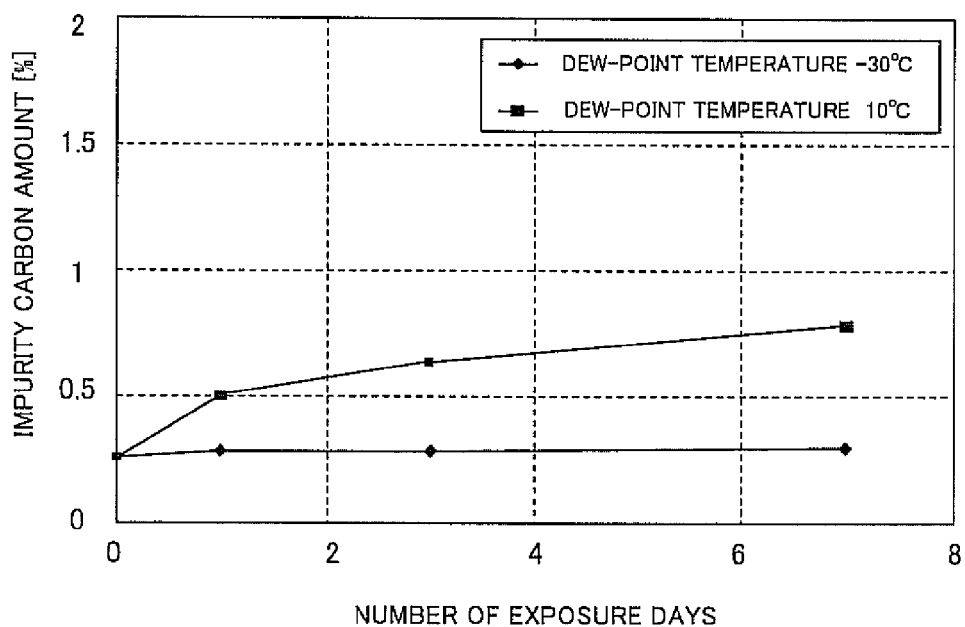
FIG. 8 is a graph showing impurity carbon amount contained in a cathode active material.

The above-mentioned cathode active material was exposed under an atmosphere with a dew-point temperature of −30° C. for 7 days to measure the impurity carbon amount of the cathode active material after 1 day, 3 days and 7 days by using the above-mentioned carbon/sulfur analyzer EMIA-820 (manufactured by Horiba, Ltd.). Furthermore, with regard to the case where the above-mentioned cathode active material was exposed under an atmosphere with a dew-point temperature of 10° C. for 7 days, the impurity carbon amount of the cathode active material after 1 day, 3 days and 7 days was measured similarly. The results are shown in FIG. 8.

The impurity carbon amount in the cathode active material exposed under an atmosphere with a dew-point temperature of −30° C. was 0.261% by weight (before being exposed), 0.281% by weight (after 1 day), 0.284% by weight (after 3 days) and 0.288% by weight (after 7 days), and the increment of the above-mentioned impurity carbon amount of the cathode active material after being exposed for 7 days with respect to the impurity carbon amount of the cathode active material before being exposed was 0.027%.

On the other hand, the impurity carbon amount in the cathode active material exposed under an atmosphere with a dew-point temperature of 10° C. was 0.261% by weight (before being exposed), 0.507% by weight (after 1 day), 0.639% by weight (after 3 days) and 0.773% by weight (after 7 days), and the increment of the above-mentioned impurity carbon amount of the cathode active material after being exposed for 7 days with respect to the impurity carbon amount of the cathode active material before being exposed was 0.512%.

Example 2

An all solid state battery was obtained in the same manner as Example 1 except for exposing the above-mentioned applied film to humidified nitrogen (dew-point temperature: 15° C., pure nitrogen with impurities of 1000 ppm or less) for 24 hours to perform hydrolysis promoting step after completing the coating by applying the above-mentioned alkoxide solution on the surface of the above-mentioned cathode active material during the production of the composite active material.

[Evaluation 2]

Figure 9:
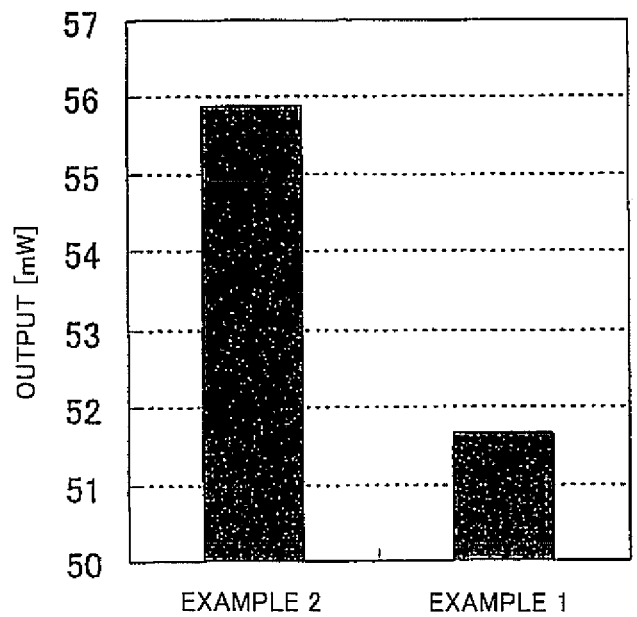
FIG. 9 is a graph showing an output of a battery of Example 1 and Example 2.

The obtained all solid state battery was charged up to a voltage of 4.55 V and thereafter discharged to 2.5 V to thereafter measure a five-second output at a voltage of 3.6 V. The output of the battery of Example 2 was 55.8 mW and the output of the battery of Example 1 was 51.7 mW. The results are shown in FIG. 9. Thus, in the present invention, it might be confirmed that the output was improved by performing hydrolysis promoting step under a humidified inert gas atmosphere. Specifically, it might be confirmed that the output was improved by 8% in Example 2 as compared with Example 1.

Figure 10:
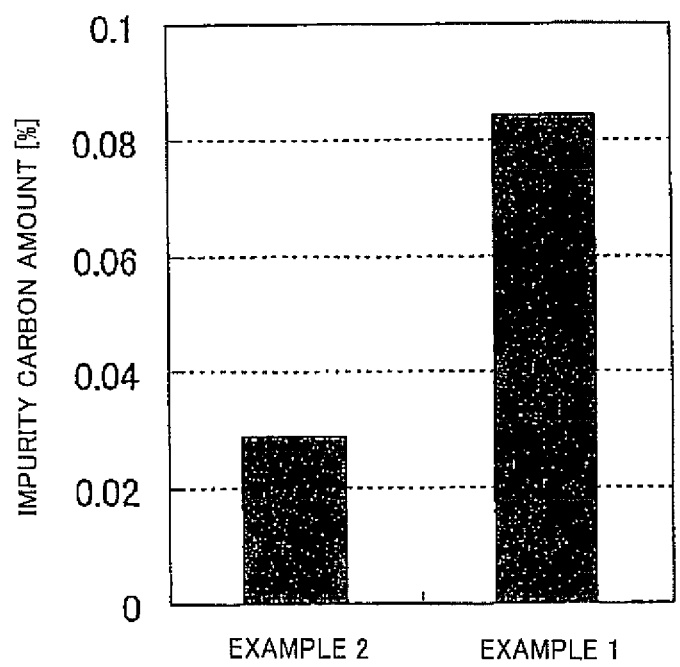
FIG. 10 is a graph showing impurity carbon amount contained in a composite active material of Example 1 and Example 2.

Furthermore, with regard to the composite active material of Example 2 and Example 1, the impurity carbon amount contained in the coat layer was measured by the following measuring method. That is to say, the composite active material was measured by a carbon/sulfur analyzer EMIA-820 (manufactured by Horiba, Ltd.) to measure the impurity carbon amount $A_1$ with respect to the weight of the composite active material. The impurity carbon amount $A_1$ of the composite active material of Example 2 was 0.029% by weight, and the impurity carbon amount $A_1$ of the composite active material of Example 1 was 0.084% by weight. The results are shown in FIG. 10. Thus, in the present invention, it might be confirmed that the impurity carbon amount $A_1$ contained in the coat layer was remarkably decreased by performing hydrolysis promoting step under a humidified inert gas atmosphere. Specifically, it might be confirmed that the impurity carbon amount $A_1$ was decreased by 65% in Example 2 as compared with Example 1.

Example 3-1

An all solid state battery was obtained in the same manner as Example 2 except for modifying the time for exposing the applied film to humidified nitrogen into 4 hours.

Examples 3-1 to 3-4 and Comparative Example 2

An all solid state battery was obtained in the same manner as Example 2 except for modifying the time for exposing the applied film to humidified nitrogen into 8 hours, 24 hours, 30 hours and 0 hour, respectively.

[Evaluation 3]

Figure 11:
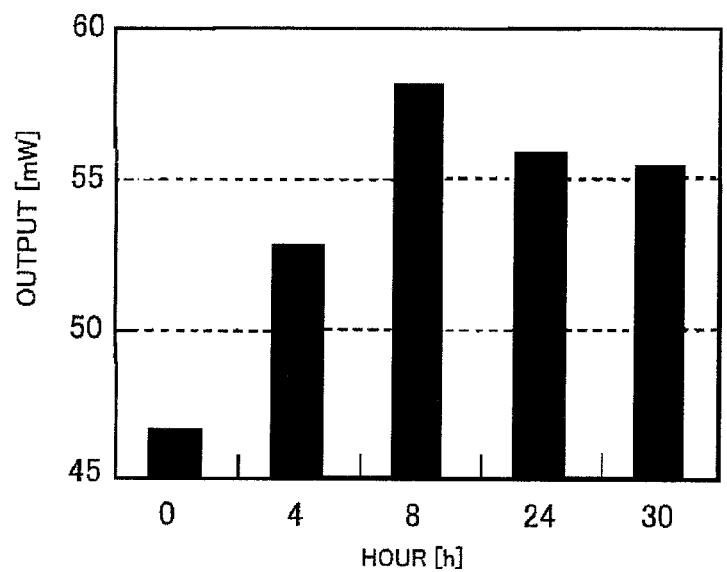
FIG. 11 is a graph showing an output of a battery of Examples 3-1 to 3-4 and Comparative Example 2.

The obtained all solid state battery was charged up to a voltage of 4.55 V and thereafter discharged to 2.5 V to thereafter measure a five-second output at a voltage of 3.6 V. The results are shown in Table 1 and FIG. 11.

TABLE 1

|  | HOUR [h] | OUTPUT [mW] |
| --- | --- | --- |
| COMPARATIVE EXAMPLE 2 | 0 | 46.6 |
| EXAMPLE 3-1 | 4 | 52.8 |
| EXAMPLE 3-2 | 8 | 58.1 |
| EXAMPLE 3-3 | 24 | 55.8 |
| EXAMPLE 3-4 | 30 | 55.4 |

Thus, in the present invention, the exposure time is preferably 4 hours or more. Similarly, in the present invention, the exposure time is preferably 30 hours or less, more preferably 24 hours or less. The reason therefor is that the output is further improved.

Example 4

An all solid state battery was obtained in the same manner as Example 1 except for modifying the time for exposing the applied film to the air into 8 hours.

[Evaluation 4]

Figure 12A:
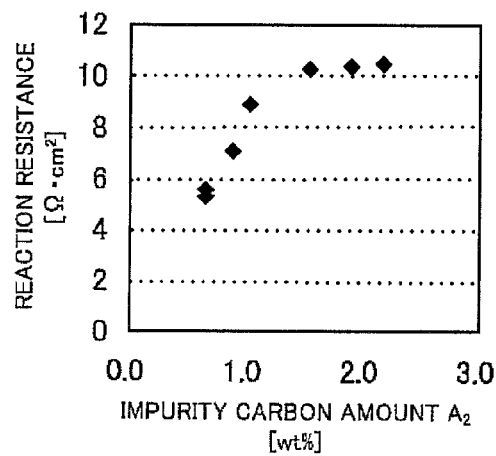
FIGS. 12A and 12B are a graph showing reaction resistance of a battery of Example 1, Examples 3-1 to 3-4, Example 4, and Comparative Example 1.
Figure 12B:
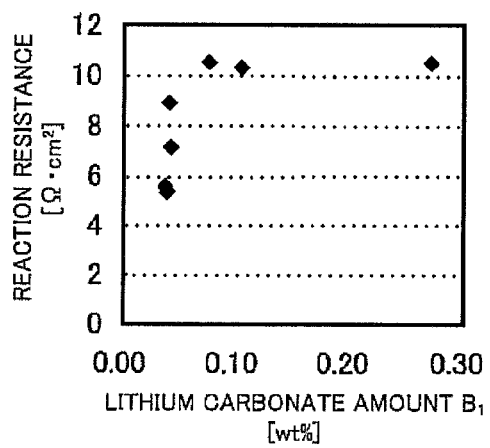

With regard to the composite active material of Example 1, Examples 3-1 to 3-4, Example 4 and Comparative Example 1, the impurity carbon amount ($A_1$, $A_2$) and the lithium carbonate amount ($B_1$) were measured. The measuring method is as described above. Furthermore, the all solid state battery obtained in Example 1, Examples 3-1 to 3-4, Example 4 and Comparative Example 1 was charged up to a voltage of 4.55 V and thereafter discharged to 2.5 V to thereafter measure reaction resistance at a voltage of 3.6 V by an alternating current impedance method. The results are shown in Table 2, Table 3 and FIGS. 12A and 12B.

TABLE 2

|  | HYDROLYSIS PROMOTING TREATMENT | | IMPURITY CARBON AMOUNT $A_1$ WITH RESPECT TO COMPOSITE ACTIVE MATERIAL | IMPURITY CARBON AMOUNT $A_2$ WITH RESPECT TO COAT LAYER | REACTION RESISTANCE |
| --- | --- | --- | --- | --- | --- |
|  | ATMOSPHERE | HOUR | [% BY WEIGHT] | [% BY WEIGHT] | [$\Omega \cdot cm^2$] |
| EXAMPLE 3-1 | NITROGEN | 4 HOURS | 0.046 | 1.03 | 8.9 |
| EXAMPLE 3-2 | NITROGEN | 8 HOURS | 0.039 | 0.88 | 7.1 |
| EXAMPLE 3-3 | NITROGEN | 24 HOURS | 0.029 | 0.66 | 5.6 |
| EXAMPLE 3-4 | NITROGEN | 30 HOURS | 0.029 | 0.66 | 5.3 |
| EXAMPLE 4 | AIR | 8 HOURS | 0.069 | 1.56 | 10.3 |
| EXAMPLE 1 | AIR | 24 HOURS | 0.084 | 1.90 | 10.4 |
| COMPARATIVE EXAMPLE 1 | NO TREATMENT | NO TREATMENT | 0.096 | 2.17 | 10.5 |

TABLE 3

|  | HYDROLYSIS PROMOTING TREATMENT | | LITHIUM CARBONATE AMOUNT $B_1$ WITH RESPECT TO ACTIVE MATERIAL | REACTION RESISTANCE |
| --- | --- | --- | --- | --- |
|  | ATMOSPHERE | HOUR | [% BY WEIGHT] | [$\Omega \cdot cm^2$] |
| EXAMPLE 3-1 | NITROGEN | 4 HOURS | 0.041 | 8.9 |
| EXAMPLE 3-2 | NITROGEN | 8 HOURS | 0.042 | 7.1 |
| EXAMPLE 3-3 | NITROGEN | 24 HOURS | 0.037 | 5.6 |
| EXAMPLE 3-4 | NITROGEN | 30 HOURS | 0.039 | 5.3 |
| EXAMPLE 4 | AIR | 8 HOURS | 0.105 | 10.3 |
| EXAMPLE 1 | AIR | 24 HOURS | 0.272 | 10.4 |
| COMPARATIVE EXAMPLE 1 | NO TREATMENT | NO TREATMENT | 0.075 | 10.5 |

Thus, in the present invention, it was confirmed that the reaction resistance was abruptly reduced when the impurity carbon amount and the lithium carbonate amount became less than a predetermined ratio.

REFERENCE SIGNS LIST

1 . . . composite active material
2 . . . active material
3 . . . coat layer
11 . . . process chamber
12 . . . fluidizing gas feed unit
13 . . . fluidizing gas exhausting unit
14 . . . coating liquid feed unit
15 . . . hydrolysis promoting fluid feed unit
16 . . . solid-gas separation filter
17 . . . neck-in portion
20 . . . coating apparatus
21 . . . cathode active material layer
22 . . . anode active material layer
23 . . . solid electrolyte layer
24 . . . cathode current collector
25 . . . anode current collector
26 . . . battery case
30 . . . all solid state battery

What is claimed is:

1. A producing method of a composite active material having an active material and a coat layer containing an ion conductive oxide and formed on a surface of the active material, comprising:

an applied film forming step of forming an applied film by applying a coating liquid for coat layer, containing an alkoxide compound as a raw material of the ion conductive oxide, on a surface of the active material under an atmosphere of lower dew-point temperature than dew-point temperature where the active material deteriorates;

a hydrolysis promoting step of promoting hydrolysis of the alkoxide compound by exposing the applied film under an atmosphere of higher dew-point temperature than dew-point temperature in the applied film forming step; and a heat-treating step of forming the coat layer by heat-treating the applied film after the hydrolysis promoting step;

wherein the dew-point temperature in the hydrolysis promoting step is 0° C. or more.

2. The producing method of a composite active material according to claim 1, wherein the dew-point temperature in the applied film forming step is −30° C. or less.

3. The producing method of a composite active material according to claim 1, wherein the hydrolysis promoting step is performed under a humidified atmosphere.

4. The producing method of a composite active material according to claim 1, wherein the hydrolysis promoting step is performed under an inert gas atmosphere.

5. The producing method of a composite active material according to claim 1, wherein exposure time in the hydrolysis promoting step is 4 hours or more.

6. The producing method of a composite active material according to claim 1, wherein exposure time in the hydrolysis promoting step is 24 hours or less.

7. The producing method of a composite active material according to claim 1, wherein a difference between the dew-point temperature of the hydrolysis promoting step and the dew-point temperature in the applied film forming step is 10° C. or more.

* * * * *